United States Patent [19]

Bowen et al.

[11] Patent Number: 5,098,799
[45] Date of Patent: Mar. 24, 1992

[54] BATTERY ELECTRODE GROWTH ACCOMMODATION

[75] Inventors: Gerald K. Bowen, Cedarburg; Michael G. Andrew, Wauwatosa; Michael D. Eskra, Fredonia, all of Wis.

[73] Assignee: Globe-Union Inc., Milwaukee, Wis.

[21] Appl. No.: 618,653

[22] Filed: Nov. 27, 1990

[51] Int. Cl.⁵ .................................. H01M 4/73
[52] U.S. Cl. ................................ 429/67; 429/211; 429/234
[58] Field of Search ............ 429/211, 234, 233, 245, 429/72, 67

[56] References Cited

U.S. PATENT DOCUMENTS

| | | | |
|---|---|---|---|
| 3,516,863 | 6/1970 | Willmann et al. | 429/234 X |
| 3,690,950 | 9/1972 | Wheadon et al. | 429/234 |
| 3,738,871 | 6/1973 | Scholle | 429/234 |
| 4,166,155 | 8/1979 | Mao et al. | 429/245 X |

Primary Examiner—Anthony Skapars
Attorney, Agent, or Firm—Foley & Lardner

[57] ABSTRACT

An electrode for a lead acid flow through battery, the grids including a plastic frame, a plate suspended from the top of the frame to hang freely in the plastic frame and a paste applied to the plate, the paste being free to allow for expansion in the planar direction of the grid.

5 Claims, 2 Drawing Sheets

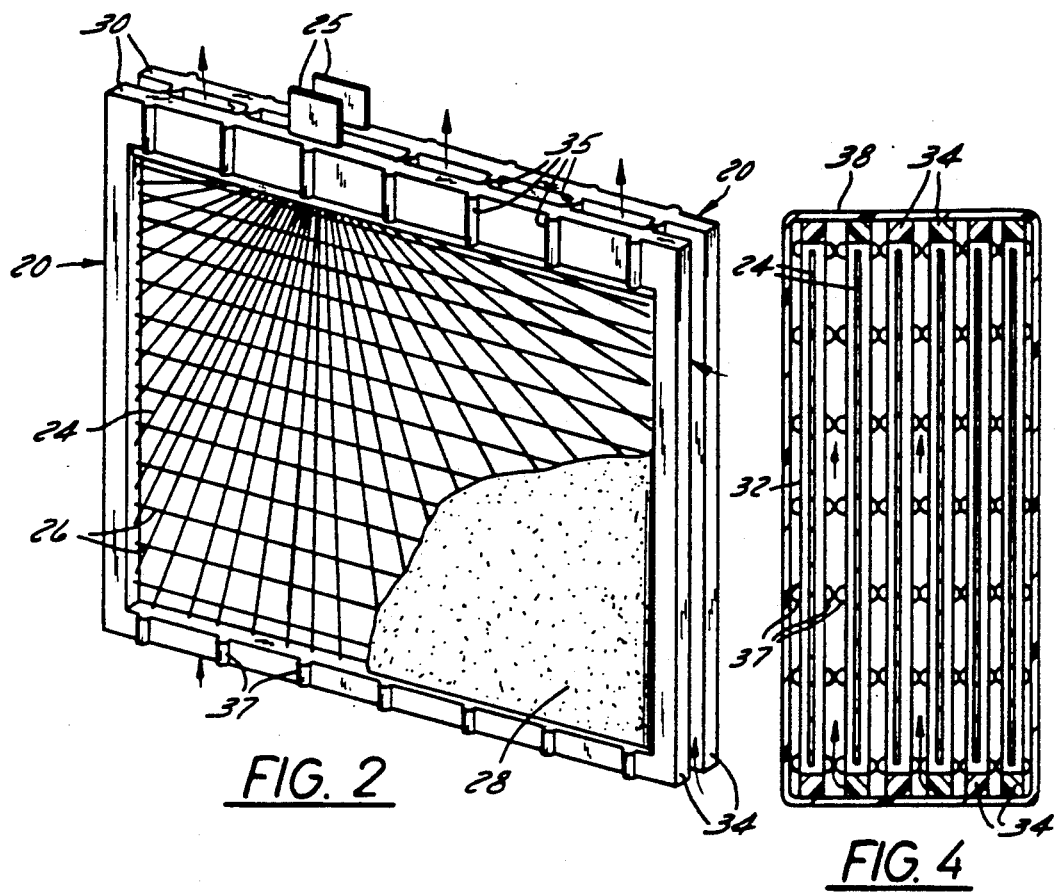
FIG. 2
FIG. 4
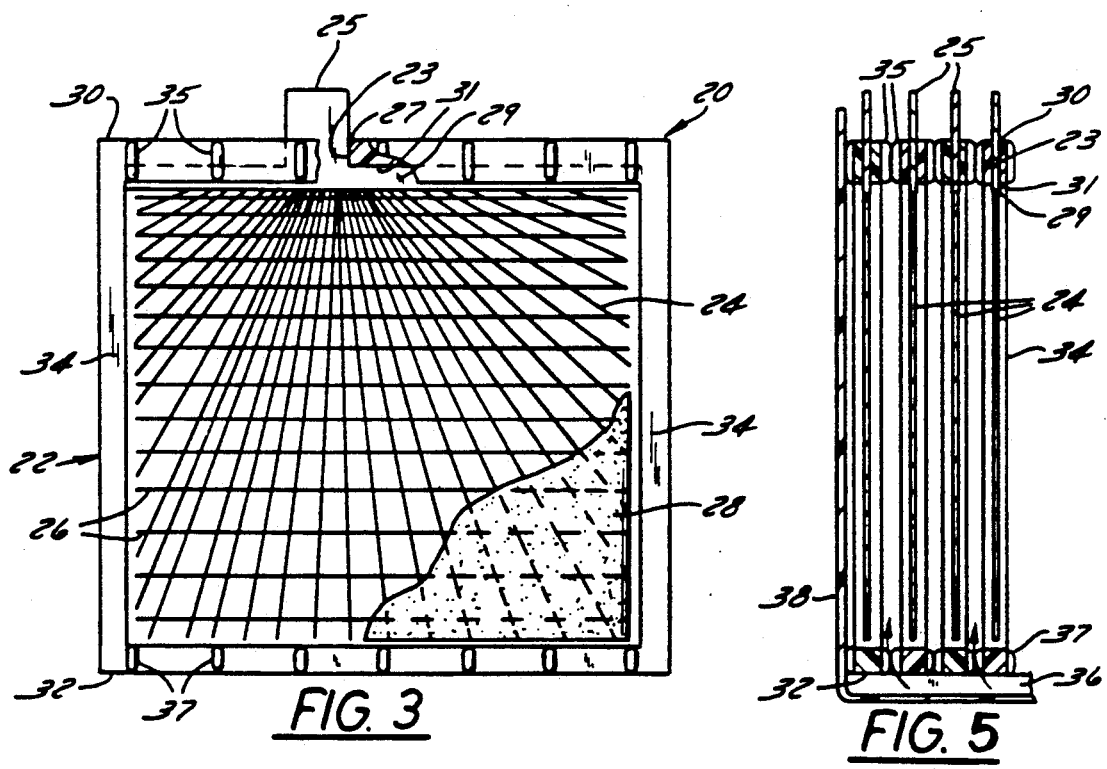
FIG. 3
FIG. 5

5,098,799

BATTERY ELECTRODE GROWTH ACCOMMODATION

The Government of the United States of America has rights in this invention pursuant to Contract No. DE-AC08-86NV 10509 awarded by the Department of Energy.

FIELD OF THE INVENTION

The present invention relates, generally, to lead acid flow through batteries and, more particularly, to an electrode assembly including a plastic frame having a conductive grid coated with an electrochemically active material and suspended in the frame in a spaced relation to the sides of the frame to allow expansion of the electrode in the planar direction of the frame.

BACKGROUND OF THE INVENTION

Lead storage batteries typically comprise a series of thin, flat, generally rectangular grids for carrying current through the battery. The grids also serve as a substrate for supporting electrochemically active material or paste deposited thereon during manufacture. The paste typically comprises a mixture of lead oxide and a dilute acid solution, for example, sulfuric acid. The paste composition is determined by power requirements, cost and battery environment as is known in the art.

The grid is typically screenlike, having a matrix or honeycomb pattern of alternating metal strips and open spaces. A porous chemical paste is applied to the grid completely filling the spaces between the alternating strips and the lead frame members at the top, bottom and sides. After the paste is cured, the electrodes are assembled into a battery casing whereupon the housing is filled with aqueous electrolyte solution and sealed.

The electrolyte flows through the electrodes during the charge and discharge phases of battery operation. During the charging and discharging cycle, both electrochemical and morphological changes occur forcing the paste to expand. The paste is prevented from expanding in the plane of the grid by the lead frame and is forced to expand in a direction normal to the plane of the grid. Expansion in this direction causes the paste to expand into the spaces between the grids and in some instances to crack. This restricts the flow of the electrolyte solution between the electrodes and allows the solution to flow through the cracks resulting in a reduced battery life.

SUMMARY OF THE PRESENT INVENTION

The present invention advantageously provides a lead-acid type electrode in which the active material or paste is allowed to expand in the plane of the grid. The electrode is suspended in a plastic frame having a top, bottom and sides. The electrode is supported at the top of the frame by the grid lug with the bottom and sides of the electrode spaced from the frame so that the electrode hangs freely in the frame. The chemical paste which is applied to the grid is thereby allowed to expand in the planar direction of the electrode. With this arrangement, the paste will not expand in a direction normal to the plane of the grid.

Another aspect of this invention relates to the creation of a flow-by rather than a flow-through system of circulating the electrolyte solution between the electrodes. The electrolyte solution is stored in a reservoir in the bottom of the battery casing and is pumped vertically between the electrodes allowing the solution to diffuse through the porous material on the grid. The solution then flows across the top of the frames and returns to the bottom of the battery casing.

Other principal features and advantages of the invention will become apparent to those skilled in the art upon review of the following drawings, the detailed description and the appended claims.

DETAILED DESCRIPTION OF THE DRAWINGS

FIG. 2 is a perspective view of two of the battery electrodes of the present invention aligned in a parallel spaced relation.

FIG. 3 is an elevation view of the electrodes according to the present invention.

FIG. 4 is a top view, in section, of a battery showing the arrangement of the electrodes in the casing.

FIG. 5 is an elevation view, in section, of the side of a battery casing showing the flow path of the electrolyte through the electrodes.

Figure 1:
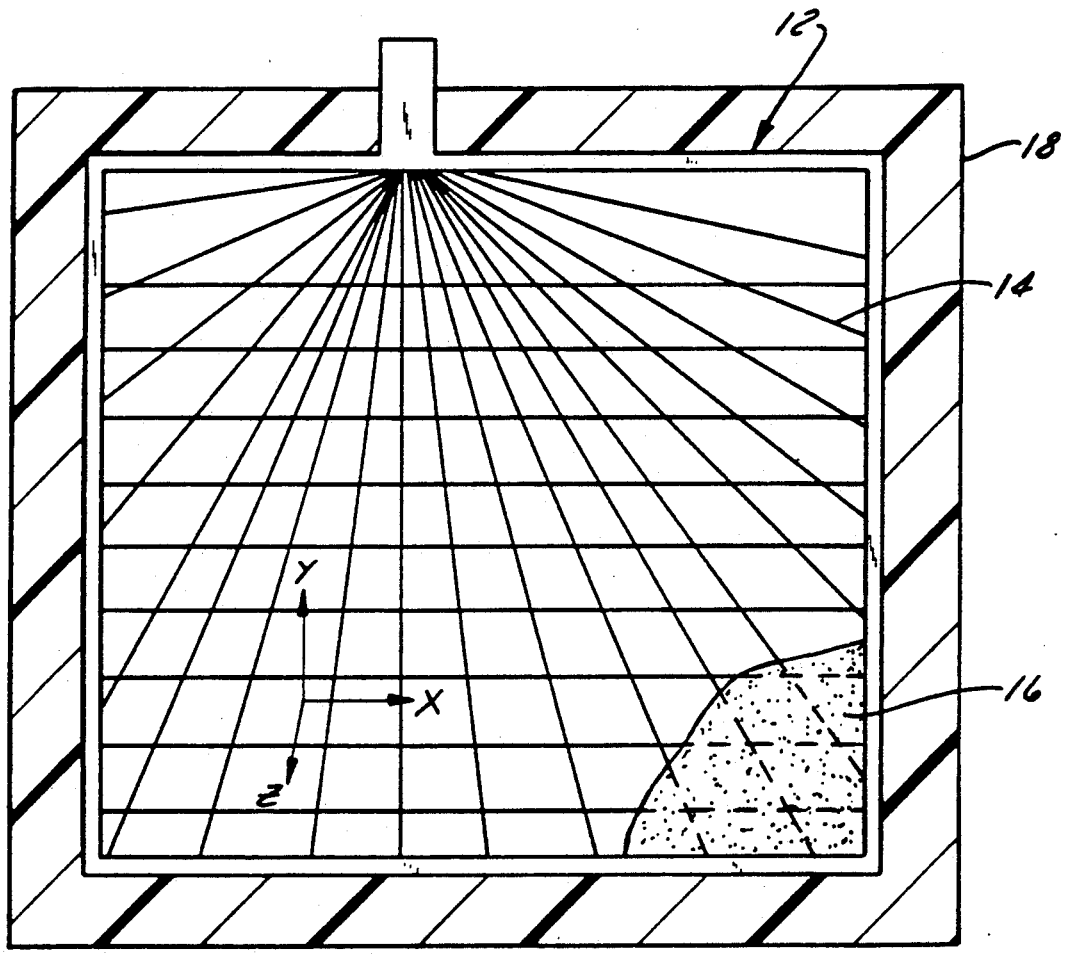
FIG. 1 is a view of a prior art electrode mounted in a lead frame.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

Referring to FIG. 1, a lead acid electrode 10 is shown, which is of the type presently being used in a lead acid battery. The electrode includes lead frame 12 having a grid 14 supported by the top, bottom and sides of the frame. A porous chemical paste 16 is applied to the grid 14 prior to inserting the electrode into the battery casing 18. The electrolyte solution flows through the paste in the grids in a referenced "Z" direction during the operating cycle of the battery. During the charging and discharging cycle, electrochemical and morphological changes occur which cause the paste to expand.

The frame 12 surrounding the grid 14 prevents the paste from expanding in the planar or X and Y direction and forces the paste to expand in the normal or Z direction due to the compressive force imposed on the paste by the frame. Expansion in the Z direction causes the paste to crack and restricts the flow of the electrolyte solution between the electrodes resulting in an inefficient battery with shortened life.

Referring to FIGS. 2 and 3, the electrode 20 according to the present invention is shown which includes a plastic frame 22 having a grid 24 connected to a lug 25 and suspended from the top of the frame. The grid 24 has a screenlike pattern or matrix formed by strips of lead 26 defining open spaces which are filled with a chemical paste 28. The paste is applied to the grid 24 under sufficient pressure to fill all the interstitial spaces. The paste 28 comprises a mixture of lead oxide or a blend of oxides and a dilute acid solution, for example, sulfuric acid. Reaction occurs during paste preparation producing basic lead sulfate The lead sulfate is a cementing material which hardens after application and then allows convenient handling of the electrodes. The specific composition of the paste varies widely for different batteries and is dictated by battery design as is known in the art.

In the preferred design, the electrode 20 includes a plastic frame 22 having a top 30, a bottom 32 and sides 34. The screenlike grid 24 is connected to the lug 25 and is suspended from the top 30 of the frame so that the grid hangs freely in a spaced relation to the sides 34 and bottom 32 of the plastic frame. In this regard it should be noted in FIG. 3 that the lug 25 is positioned in an opening 23 in the top 30 and retained therein by an epoxy 27. The upper edge 29 of the grid 24 is also positioned in a slot in the bottom of the top of the frame and retained therein by an epoxy 31. The space provided between the edges of the grid 24 and the sides 34 and bottom 32 of the plastic frame allows the paste 28 on the grid 24 to expand in the planar or X and Y directions rather than the normal or Z direction of the grid as the battery goes through charge and discharge cycles. The spaces between the grid and the sides and bottom of the frame 22 can be determined from electrode growth data. In a battery of a rated capacity of 100 Ah the spaces would be approximately 0.055 inches.

The use of a battery electrode of this design also provides for a flow-by rather than a flow-through system of circulating the electrolyte solution. In this regard, it should be noted that the top 30 and bottom 32 of the frame 22 are provided with spacers 35 and 37, respectively, to provide a space between adjacent frames. Specifically and referring to FIGS. 4 and 5, the electrolyte solution is shown flowing through a reservoir 36 provided in the bottom of the battery casing 38. The solution rises vertically between the electrodes 20 allowing the solution to diffuse through the porous chemical paste on the grids 24. The solution flows upward in the spaces between the electrodes and flows upward in the spaces between the electrodes and flows across the top of the electrodes back to the reservoir. The electrolyte is circulated by means of a pump (not shown) which is of a conventional design.

Thus, it should be apparent that there has been provided in accordance with the present invention a battery electrode which allows the chemical paste to grow in the frame that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

We claim:

1. An electrode for a lead storage battery, said electrode comprising a plastic frame, an electrically conductive lug mounted in the top of said frame, a porous grid suspended from said lug and a chemical paste applied to said grid, said grid and said paste being in a spaced relation to said frame whereby said paste is free to expand in the planar direction of said grid.

2. The electrode according to claim 1 wherein said frame includes a top and a bottom connected by sides, the edges of said porous grid being spaced from the bottom and sides of said frame.

3. A flow through battery comprising a battery casing,
 a plurality of electrodes mounted in a parallel spaced relation in said casing, said electrodes being spaced from the top and bottom of said casing to define a reservoir in the top and bottom of said casing, each of said electrodes including a plastic frame having a top and a bottom connected by sides, a screenlike grid suspended from the top of said frame in a spaced relation to the bottom and sides of said frame, a paste applied to said grid in spaced relation to the bottom and sides of said frame, and
 means for pumping electrolyte from said reservoir in the bottom of said casing to the said reservoir in the top of said casing.

4. An electrode for an electric storage battery, said electrode comprising a plastic frame having a top member, and a bottom member connected by side members, said top member including an elongate slot in the bottom thereof and an opening through the top member,
 a grid aligned in said elongate slot and a lug connected to said grid and projecting through said opening,
 said grid being spaced from said side members and said bottom member, and
 a chemical paste applied in spaced relation to said side members and said bottom member to both sides of said grid to fill all of the interstitial spaces in said grid.

5. An electric storage battery comprising a casing, a plurality of electrodes mounted in a parallel spaced relation in said casing, each electrode including a plastic frame having a grid suspended from a lug at the top of the frame, the edges of said grid being spaced from said frame, a chemical paste also being spaced from said frame and covering both sides of said grid, said electrodes being spaced from the top and bottom of the casing, an electrolyte filling said casing and means for circulating said electrolyte from the space at the bottom of said casing through the spaces between said electrodes to the space at the top of said casing.

* * * * *